United States Patent
Bard et al.

(10) Patent No.: US 7,286,714 B2
(45) Date of Patent: Oct. 23, 2007

(54) METHOD AND DEVICE FOR COMPRESSING AN IMAGE SIGNAL BASED UPON DIFFERENTIAL QUANTIZATION OF DATA

(75) Inventors: Jean-Michel Bard, Crolles (FR); Jean-Luc Danger, Antony (FR); Lucas Hui, Singapore (SG); Christophe Cunat, Paris (FR)

(73) Assignees: STMicroelectronics S.A., Montrouge (FR); Group des Ecoles des Telecommunications, Paris (FR); STMicroelectronics Asia Pacific Pte. Ltd., Singapore (SG)

( * ) Notice: Subject to any disclaimer, the term of this patent is extended or adjusted under 35 U.S.C. 154(b) by 513 days.

(21) Appl. No.: 10/251,658

(22) Filed: Sep. 19, 2002

(65) Prior Publication Data

US 2003/0113025 A1    Jun. 19, 2003

(30) Foreign Application Priority Data

Sep. 21, 2001   (FR) ................................... 01 12209

(51) Int. Cl.
*G06K 9/36*   (2006.01)
*G06K 9/46*   (2006.01)

(52) U.S. Cl. ...................... 382/251; 382/248
(58) Field of Classification Search ................. 382/248
See application file for complete search history.

(56) References Cited

U.S. PATENT DOCUMENTS

| | | | |
|---|---|---|---|
| 5,144,424 A | 9/1992 | Savatier | 358/133 |
| 5,374,958 A | 12/1994 | Yanagihara | 348/405 |
| 5,410,352 A * | 4/1995 | Watanabe | 375/240.03 |
| 5,677,734 A | 10/1997 | Oikawa et al. | 348/405 |
| 5,838,826 A * | 11/1998 | Enari et al. | 382/234 |
| 5,937,098 A * | 8/1999 | Abe | 382/239 |
| 6,037,985 A | 3/2000 | Wong | 348/405 |
| RE37,091 E * | 3/2001 | Tanaka et al. | 348/409.1 |

(Continued)

OTHER PUBLICATIONS

Rhee, S. et al., "A New Quantizer Selection Scheme for Digital VCR," *IEEE Trans. on Consumer Electronics*, 43(3):879-884, Aug. 1, 1997.

Wang, J. et al., "Dynamic Rate Scaling of Coded Digital Video for IVOD Applications," *IEEE Trans. on Consumer Electronics*, 44(3):743-749, Jun. 2, 1998.

*Primary Examiner*—Wenpeng Chen
*Assistant Examiner*—Yuzhen Ge
(74) *Attorney, Agent, or Firm*—Lisa K. Jorgenson; Robert Iannucci; Seed IP Law Group PLLC

(57) ABSTRACT

Method of compressing a digital image signal in which a first quantization step set, which is unique for a given segment, is determined so that the number of bits needed to encode the quantized data corresponding to this segment is greater than a target value. This first quantization step set then being modified, as a priority, for the blocks of the segment for which the gain, in the course of this modification, on the reduction of the number of bits needed to encode the quantized data corresponding to the segment to which it belongs, is the highest. This modification is carried out, on as many blocks as is necessary for the number of bits of this segment to be less than or equal to the target value. Device to implement this method.

19 Claims, 5 Drawing Sheets

U.S. PATENT DOCUMENTS

| | | | |
|---|---|---|---|
| 6,590,936 B1 * | 7/2003 | Kadono | 375/240.12 |
| 6,597,815 B1 * | 7/2003 | Satoh et al. | 382/251 |
| 6,865,225 B2 * | 3/2005 | Kitamura et al. | 375/240.03 |
| 6,879,632 B1 * | 4/2005 | Yokoyama | 375/240.13 |
| 6,895,052 B2 * | 5/2005 | Hanamura et al. | 375/240.03 |
| 2001/0021220 A1 | 9/2001 | Fert et al. | 375/240.03 |

* cited by examiner

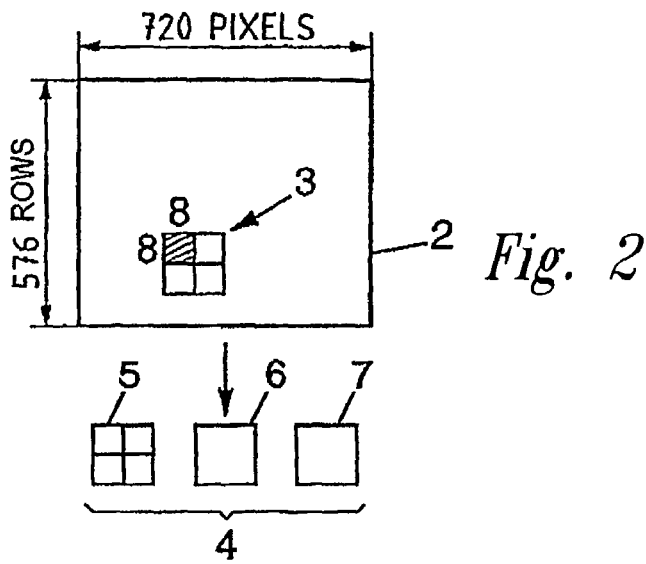
*Fig. 2*
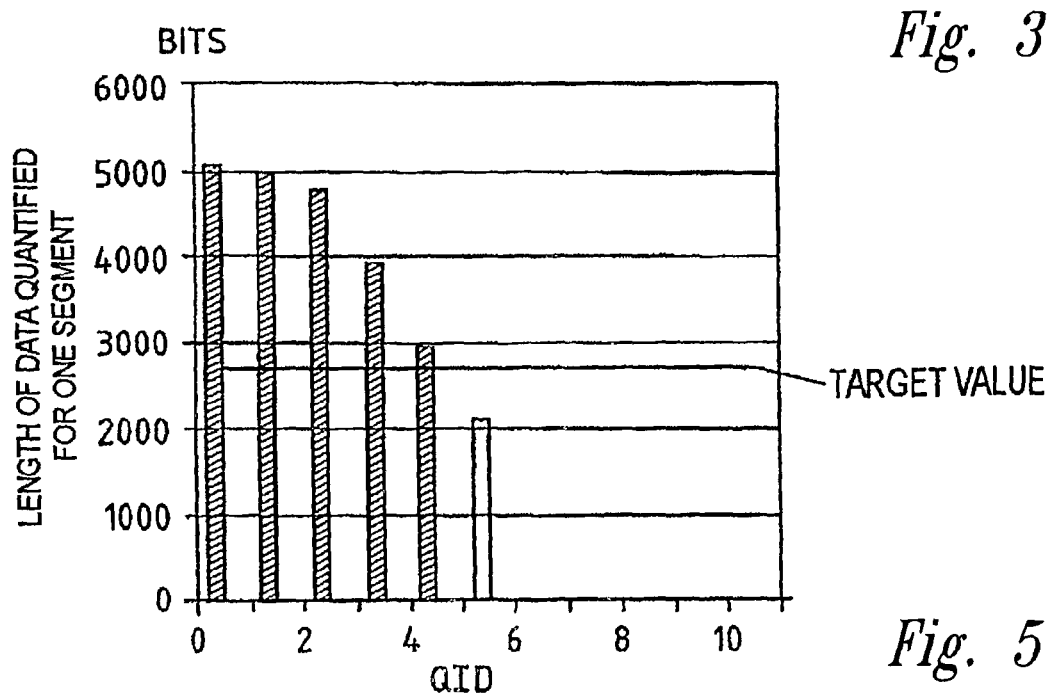
*Fig. 3*
*Fig. 5*

METHOD AND DEVICE FOR COMPRESSING AN IMAGE SIGNAL BASED UPON DIFFERENTIAL QUANTIZATION OF DATA

BACKGROUND OF THE INVENTION

1. Field of the Invention

The invention relates to a method of compressing a digital image signal, especially a video signal, and to a device for implementing this method.

More specifically, the invention relates to the compression, by devices which convert analog video signals into digital signals and encode them by transformation into a frequency domain, in particular in order to store the corresponding information on magnetic media. These are, for example, devices called VTRs or Video Tape Recorders.

2. Description of the Related Art

An image is generally recorded on a medium in the form of a collection of data associated with points of the image called pixels. In order to do this, the image is broken down into matrices of pixels. For example, in the red-green-blue color system, one matrix of pixels is associated with each of these three color components. These three components are frequently replaced by one luminance component combined with two chrominance components.

A video signal consists of a series of such images.

Methods for compressing a digital video signal are already known from the prior art, comprising:

dividing matrices of pixels into blocks of N×M pixels (N and M being non-zero integers), that is to say N×M points of a spatial domain; this results in spatial blocks of N by M coefficients for each component;

grouping several spatial blocks into one macroblock; in a common embodiment, one macroblock integrates a number of luminance blocks and one or two chrominance blocks, the spatial resolution of the luminance pixels usually being finer than that of the chrominance pixels;

assembling several macroblocks into one segment;

transforming, in the frequency domain, N×M coefficients of each spatial block, in order to obtain a frequency block, called a DCT block;

a step of quantizing the coefficients thus obtained inside each segment; and a step of conservative compression of the quantized coefficients.

In the same way that there is a one-to-one correspondence between a spatial block and a frequency block, it is possible to associate a macroblock of frequency blocks with a macroblock of spatial blocks, and a segment in the frequency domain with a segment in the spatial domain. Subsequently, it will be equally possible to use the same term "macroblock" ("segment") to denote a macroblock (segment) in the spatial domain or a macroblock (segment) in the frequency domain.

In the methods mentioned above, one macroblock consists, for example, of four DCT luminance blocks and of two or four DCT chrominance blocks. One segment, for example, consists of five macroblocks. One segment must be encoded by a number of bits corresponding to a target value, so that it is possible to control the output bit rate of the compression device.

The quantization consists in dividing the coefficients of the DCT blocks by a quantization step and in rounding-off the value thus obtained to the closest integer. This quantization step is chosen according to the quality desired for the image restored after compression and storage. The greater the step, the greater the loss of information introduced to each coefficient.

Each DCT block is generally quantized using a quantization step set. Thus, for example, in the standard defined by "Specifications of Consumer-Use Digital VCRs" (HD Digital VCR Conference, December 1994), a quantization step set comprises four quantization steps, each one being applied to a different portion of the same block.

U.S. Pat. No. 5,677,734 describes a method for compressing video signals in which the macroblocks of one segment are subject to a first quantization producing, after Huffman encoding, an amount of data less than a target value, then the fineness of quantization of some of the macroblocks is increased by ensuring that the amount of data for the segment does not exceed the target value. The macroblocks which are quantized more finely are chosen according to their location with respect to the center of the image.

BRIEF SUMMARY OF THE INVENTION

A method of compressing image signals making it possible to compress data constituting the signals more efficiently is provided.

According to an embodiment of the invention, is a method of compressing a digital image signal comprising coefficients allocated to the pixels of an image, this method comprising the formation of spatial blocks of N×M coefficients allocated to the pixels of the image, where N and M are non-zero integers, the transformation of each spatial block in a frequency domain in order to form a frequency block of N×M coefficients, the grouping of a plurality of frequency blocks in macroblocks and of a plurality of macroblocks in segments, together with the following steps for each segment:

first quantization of the coefficients of each frequency block, with a first quantization step set, defined for each frequency block by an index group including an index which is identical for all the frequency blocks of a macroblock, and second quantization of the coefficients of at least some of the frequency blocks, with a second quantization step set substituted for the first quantization step set.

The first and the second quantization step sets are chosen according, on the one hand, to a target value of the amount of data needed to represent the quantized coefficients of the segment and, on the other hand, to gain factors respectively calculated for the frequency blocks of the segment, the gain factor relating to one block representing a reduction, on passing from one quantization step set to the other for the block, of the amount of data necessary to represent the quantized coefficients.

This is because the method makes it possible to modify one or more quantization steps of the quantization step set for some blocks, preferably those for which this modification does not lead to a noticeable degradation of the image restored after compression of the corresponding data, so as to conserve, for the other blocks, a quantization step set with smaller quantization steps. Thus, by virtue of the method according to an embodiment of the invention, a more efficient compression is obtained, since with an equivalent amount of data, the quality of the image taken as a whole is observed to be improved, or with less data, the quality of the image taken as a whole is observed to be at least equivalent, or even better.

In the standard defined by "Specifications of Consumer-Use Digital VCRs", a quantization step set is defined by two indices: QNO and CNO (or CLASS), for "Quantification Number Order" and "Class Number Order" respectively.

In exemplary embodiments of the invention, the method comprises one and/or the other of the following characteristics:

the index which is identical for all the frequency blocks of one macroblock is also identical for all the macroblocks of one segment;

the first quantization step set is chosen such that the amount of data representing the quantized coefficients of each segment, after the first quantization, is greater than the target value;

the second quantization step set gives rise to a quantization which is coarser than the first quantization step set;

the second quantization step set is chosen such that the amount of data representing the quantized coefficients of each segment, after the second quantization, is less than or equal to the target value;

the second quantization is carried out as a priority for the frequency block of the segment for which the gain factor is the highest, and repeated for at least one other frequency block of the segment, in order of decreasing gain such that the amount of data needed to represent the coefficients of the segment is greater than the said target value;

the gain factor calculated for a frequency block is the difference between the amounts of data needed to represent the quantized coefficients of the said frequency block with the first set and with the second set, respectively, divided by the amount of data needed to represent the quantized coefficients of the said frequency block with the first set;

the said amounts of data are calculated in the course of the first quantization and stored in order to calculate the gains; and the first quantization comprises three processing operations in parallel, each processing operation comprising operations of quantization, of encoding and of calculating the amount of data needed to represent the quantized data of the segment.

According to another aspect, an exemplary embodiment of the invention proposes a device for compressing a digital video signal, especially for implementing the method described above, this device comprising:

means of inputting data represented by coefficients allocated to the pixels of an image, means of forming spatial blocks of N×M coefficients allocated to the pixels of the image, where N and M are non-zero integers, means of transforming each spatial block in a frequency domain in order to form a frequency block of N×M coefficients, and means of processing image segments, each one consisting of a given number of macroblocks, themselves consisting of a given number of frequency blocks, in which the means of processing a segment comprise:

first means of quantizing the coefficients of each frequency block of the segment, in order to select a first quantization step set, attached to each frequency block and defined for each frequency block by an index group including an index which is identical for all the frequency blocks of one macroblock, second quantization means for quantizing at least some of the frequency blocks, with a second quantization step set substituted for the first quantization step set, and means of calculating a gain factor representing a reduction, on passing from one quantization step set to the other, of the amount of data needed to represent the quantized coefficients, this gain factor being taken at the level of the second quantization means in order to select the frequency blocks for which the first quantization step set is substituted by the second quantization step set.

In exemplary embodiments of the device, the latter comprises one and/or the other of the following provisions:

it comprises means of sorting the blocks having undergone the first quantization, in decreasing order of the gain factor;

it comprises means of substituting the second quantization step set for the first quantization step set, by processing the blocks, in order of decreasing gain factor, until the amount of data needed to represent the quantized data corresponding to the segment is less than or equal to a target value;

the first quantization means comprise three quantization circuits in parallel;

it comprises means of storing amounts of data needed to represent the quantized data corresponding to the segment, with the first quantization step set and with the second quantization step set, and calculated with respect to the first quantization; and it comprises means of calculating the gain factor, in which the gain factor for a frequency block is the difference between the amounts of data needed to represent the quantized coefficients of the frequency block with the first set and with the second set, respectively, divided by the amount of data needed to represent the quantized coefficients of the said frequency block with the first set.

According to yet another aspect, the invention proposes a program which can be loaded into a memory, combined with a processor, and comprising portions of code for implementing a method as defined above, on executing the said program.

Other aspects, aims and advantages of the invention will become apparent on reading the detailed description which follows of a non-limiting example of a device for compressing video signals for implementing an example, also non-limiting, of the method according to the invention.

BRIEF DESCRIPTION OF THE SEVERAL VIEWS OF THE DRAWINGS

The invention will be better understood by means of the appended drawings in which:

FIG. 2 represents schematically an exemplary data structure which can be processed by the device in the diagram of FIG. 1;

FIG. 3 is a table giving index values defining the quantization step sets for using the device shown in FIG. 1;

FIG. 5 is a diagram showing the amount of data quantized for a segment, obtained in the course of implementing certain operations on the device of FIG. 1;

DETAILED DESCRIPTION OF THE INVENTION

Figure 1:
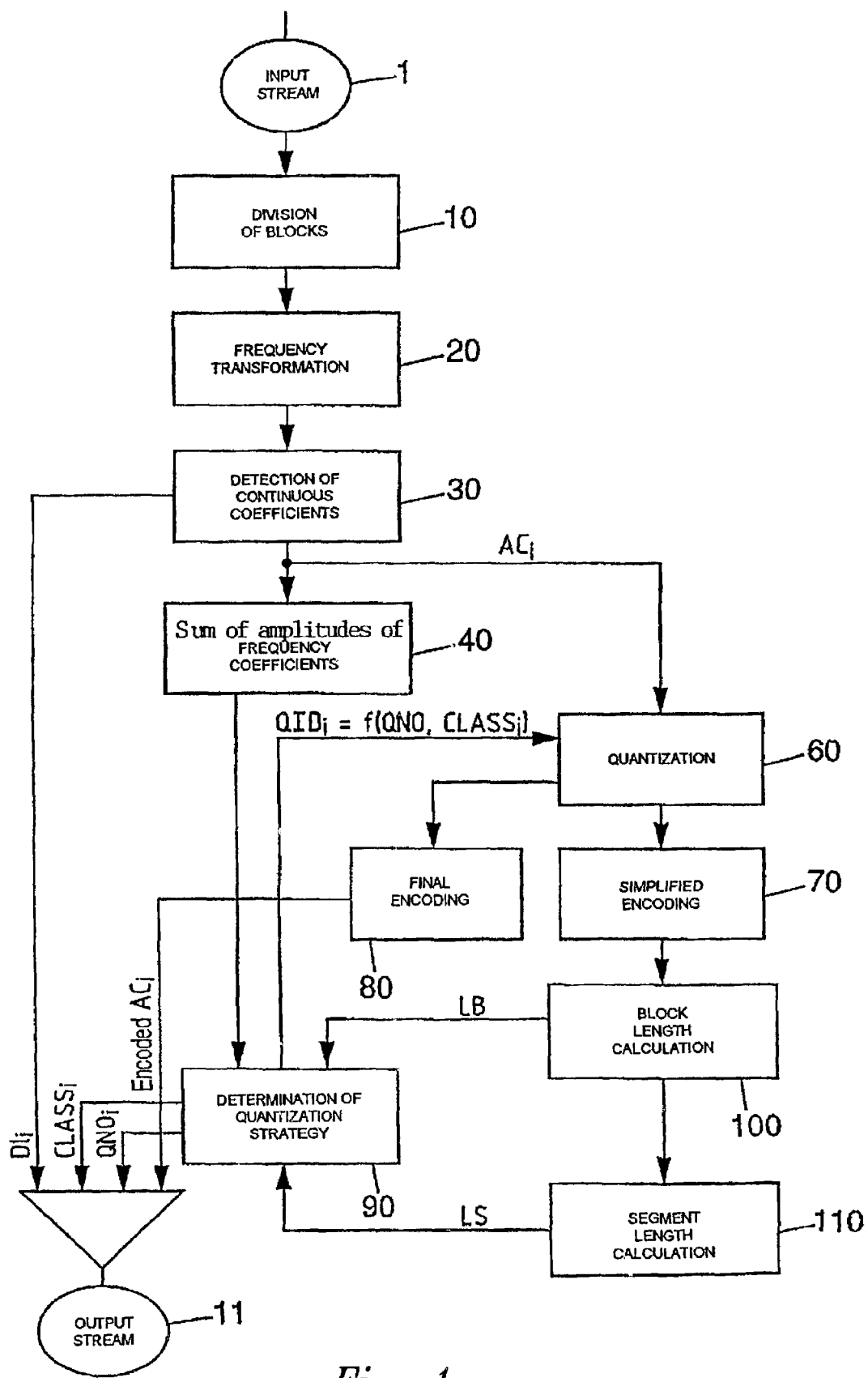
FIG. 1 is a synoptic diagram of an exemplary device according to the present invention.

A non-limiting example of a device for compressing video signals according to an exemplary embodiment of the invention is shown schematically in FIG. 1.

According to this example, an input stream 1 is injected into the input of the device. This input stream 1 consists of an assembly of digitized data corresponding to information on the pixels constituting a video image.

In general, a video image is broken down into various entities. By way of example, let us take the case where, as shown in FIG. 2, an image of 720 pixels on 576 lines is broken down into three memory planes 2, each corresponding to one component (one luminance component and two chrominance components), each memory plane itself being broken down into spatial blocks 3 consisting of 8×8 pixels. These spatial blocks 3 are grouped into macroblocks 4 of six spatial blocks 3 (four luminance blocks 5 and two chrominance blocks 6, 7). Five of these macroblocks 4 taken at pseudo-random positions in the image form a video segment.

The input stream 1 consists of a series of video segments, the size of which is to be compressed.

Each video segment is broken down into blocks 3 by a module 10. Each block 3 then undergoes, in a module 20, transformation of the data from the spatial domain to the frequency domain. This transformation corresponds, for example, to a discrete cosine transform (DCT). The frequency blocks resulting from this transformation are hereinafter called "DCT blocks". A DCT block also consists of 8×8 coefficients. One of these coefficients, at the top left of the block, is a coefficient corresponding to a continuous component of the breaking down in the frequency domain, the others being coefficients corresponding to frequency components. The coefficient corresponding to a continuous component of a DCT block i is denoted DCi. The coefficients corresponding to the frequency components of this same DCT block i are denoted ACi.

A module 30 detects the continuous coefficient DCi, from the coefficients of each DCT block i. The coefficient DCi of each DCT block i is integrated with the output stream 11 of the compression device according to the invention.

A module 40 sums the absolute values of the coefficients ACi and determines a class CLASSi for each DCT block i according to this value. This is because, if the sum of these absolute values is greater than 255, it is necessary to quantize with the class CLASSi=3, otherwise, CLASSi=2 is taken. We will see below the usefulness of this parameter CLASSi. The class CLASSi of each DCT block i is determined by a module 90 for determining the quantization strategy according to the sum of the absolute values of the coefficients ACi determined by the module 40. It is also integrated into the output stream 11.

The quantization steps which can be used to quantize the various DCT blocks of a macroblock 4 are the subject of specifications (for example, "Specifications of Consumer-Use Digital VCRs", HD Digital VCR conference, December 1994). According to these specifications, a set of four quantization steps is used to quantize various zones of a DCT block. Two parameters, QNO and CLASS, serve to define the best quantization step. The parameter CLASS corresponds to the class indicated hereinbelow. FIG. 3 gives a table grouping the values of these various parameters.

The parameter QNO, indicated in the output stream 11 of the device, is the same for all the blocks of one macroblock. A pair (QNOi, CLASSi) may be attached to each block i. A pair of this sort may also be replaced by a parameter QIDi which is unique and specific for each DCT block i (see "A New Quantizer Selection Scheme for Digital VCR", Rhee et al., IEEE Trans on Consumer Electronics, Vol 43, No. 3, August 1997, pp. 879-885 and FIG. 3).

A module 60 quantizes each DCT block i according to quantization steps corresponding to the parameter QIDi supplied by the module 90.

A module 70 carries out a simplified encoding of the data of each DCT block i. This encoding is simplified to the extent where it only carries out the encoding steps needed for calculating the length of data of the following steps.

In general, the term "length", or the term "amount", is used in this document as a synonym for the expression "number of bits needed to encode quantized data".

Next, a module 100 calculates the length of encoding data for the DCT blocks i. The length LB of the encoding data for information relating to a DCT block i, corresponding to a given QIDi, is stored in the module 90, for subsequent use. Next, a module 110 calculates the length LS of encoding data for the five macroblocks 4 of a video segment.

The length LS of the compressed data corresponding to a video segment is supplied to the module 90 in order to determine the quantization strategy for the various blocks of a video segment, and this for each video segment.

When the length LS is less than a target value VC, the coefficients ACi become subject to a final encoding by a module 80 according to QNOi and CLASSi. The target value VC corresponds to a compressed data length compatible with acceptable storage volumes and video signal processing rates. The data corresponding to the coefficients ACi and compressed by this final encoding, are integrated with the output stream 11. The parameters QNOi, identical for all the blocks of one macroblock 4, and CLASSi are also inserted into the output stream 11. Knowledge of them is enough to deduce QIDi for each DCT block i.

Information relating to the encoded coefficients ACi corresponds to the quality criteria defined in the quantization strategy.

Figure 4:
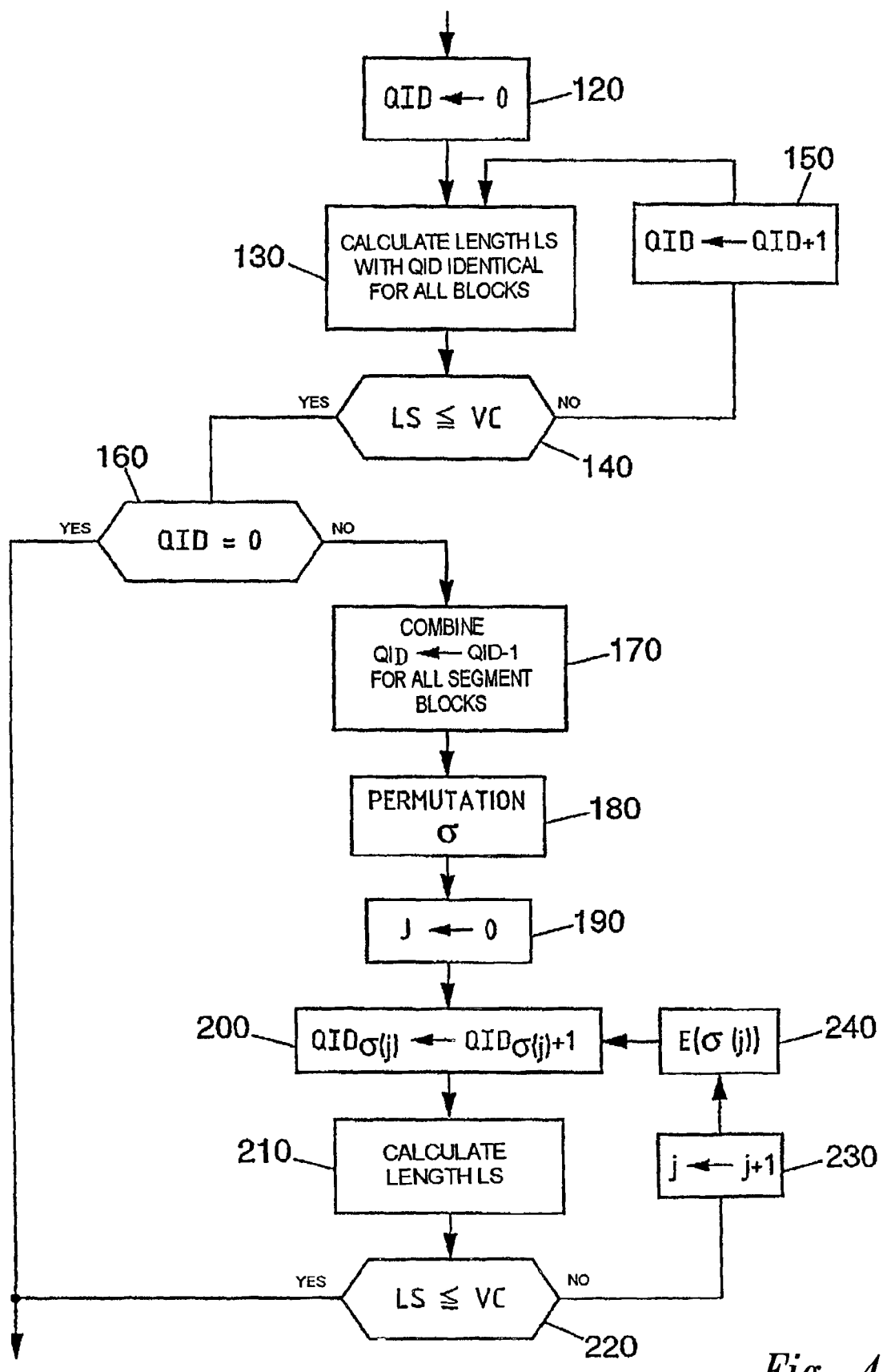
FIG. 4 is an algorithm of the quantization strategy in the device of FIG. 1.

FIG. 4 shows schematically the algorithm of the quantization strategy.

At 120, QID is initialized to 0. The smaller the value of QID, the finer the quantization steps of the corresponding set, and the better the compressed image quality (see FIG. 5).

Then a calculation 130 of the length LS of the compressed data encoding for a video segment is carried out by using an identical QID=QIDi=0 for all the macroblocks of the video segment and, consequently, for all the DCT blocks i of this video segment. This calculation 130 is carried out by the modules 60, 70, 100 and 110 in the manner indicated above.

A test 140 is carried out in order to determine whether this length LS is less than or equal to the target value VC.

If it is not, QID is incremented by one by means of the operation 150. The quantization steps corresponding to the new QID value make it possible to quantize the data of the video segment more coarsely, that is to say, with less compressed data but also with a loss of quality of the image reformed from the compressed data.

The operations 130, 140 and 150, corresponding to a first quantization (module 60), are repeated for as long as the length LS remains greater than the target value VC. They consist in determining an identical quantization step set for the thirty DCT blocks i of a video segment, by incrementing these steps progressively until the number of bits needed to encode the quantized data of the video segment is less than the target value VC. This is illustrated by FIG. 5, which gives an exemplary diagram showing the length of the data encoding for a video segment according to QID. The horizontal line towards 2700 bits corresponds to the target value VC. In this example, QID=5 gives a compressed data length less than VC, while QID=4, still for this example, gives a compressed data length greater than VC.

During the calculation 130, the lengths LB of data encoding for the information of a block i are determined and stored for each QID value tested.

When the test 140 is positive, a test 160 verifies that QID=0.

If this is effectively the case, the data cannot be compressed further and no other processing is needed. The output stream 11 consists of the values DCi, ACi and the parameters CLASSi and QNO corresponding to QID=0 for each DCT block i. A decoder operating an output stream reader 11 retrieves QIDi=f(QNO, CLASSi).

Otherwise, the value QIDi=QID−1 is associated, at 170, with all the DCT blocks i of the video segment. Following this operation, the length LS of compressed data corresponding to the video segment which would be calculated with QIDi=QID−1 for all the DCT blocks i, would then again be greater than the target value VC.

The following operations consist in bringing the value LS back below the target value by adjusting the quantization step set for some DCT blocks, these DCT blocks being those for which the increase in the quantization steps is the least detrimental to the quality of the compressed image.

The DCT blocks i then undergo a permutation σ 180. This permutation σ 180 sorts the DCT blocks i of the video segment in order of decreasing quality factor QF.

QF is the ratio of the data length needed to encode a DCT block i with QIDi=QID−1 to the difference between this length and that needed to encode a DCT block i with QIDi=QID+1. QF is the inverse of the gain factor. The higher the quality factor of a DCT block i, the shorter the length of the data needed to encode this DCT block i, without apparent loss of image quality. QF measures the gain over the reduction of the number of bits needed to encode the quantized data corresponding to the video segment. This quality factor brings out the DCT blocks which may be encoded with a short data length for the same apparent quality. Increasing the values of the quantization step set of some DCT blocks for poorer quality associated with the DCT blocks of low quality factor, makes it possible to have more DCT blocks where the steps remain smaller, therefore more DCT blocks corresponding to a better compressed image quality. The quality of the overall image is then improved.

The quality factor QF is easily and quickly calculated. This is because the lengths LB of data encoding for the information of a block i have already been determined and stored for the calculation 130 of the length LS of the compressed data encoding for a video segment.

The DCT blocks ordered by the permutation σ 180 are reindexed by an index j, the index j increasing when QF decreases.

After initialization 190 of the index j to 0, an incrementation 200 by one of the $QID_{\sigma(j=0)}$ is carried out. Then a calculation 210 of the length LS of the compressed data for the segment 9 is carried out by using, for the block $DCT_{\sigma(j=0)}$, the parameter $QID_{\sigma(j=0)}$−QID+1 and for all the other blocks $DCT_{\sigma(j)}$, the parameter $QID_{\sigma(j)}$=QID−1. The passage of QID−1 to QID+1 actually corresponds to keeping QNO constant and to changing the class CLASSi.

A test 220 is then carried out to determine whether the length LS of the video segment has again become less than the target value VC.

If not, the index j is incremented by one by means of the operation 230.

The operations 200, 210, 220, 230 and 240, corresponding to a second quantization, are repeated until LS is less than or equal to the target value VC. When this is the case, the test 220 gives an affirmative response. The process for determining the quantization steps is finished.

Figure 6:
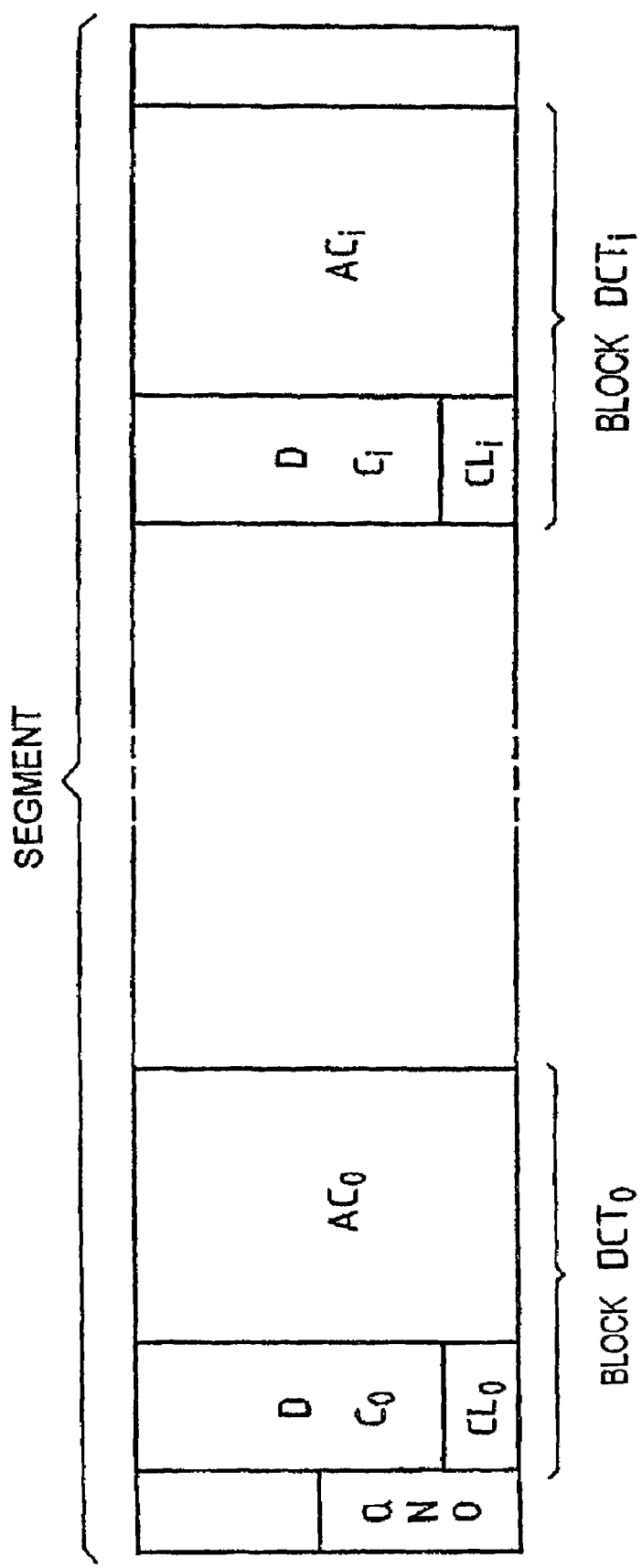
FIG. 6 shows schematically the data stream compressed on output from the device of FIG. 1.

The data are then encoded, by the module 80, with the step sets determined. They are compressed and formatted in the output stream 11 as shown schematically in FIG. 6.

For each macroblock, there is a header comprising bits encoding for the coefficient QNO. The header of each DCT block i comprises bits encoding for DCi and two bits for the class CLASSi of this DCT block i. The rest encodes for the coefficients ACi.

Figure 7:
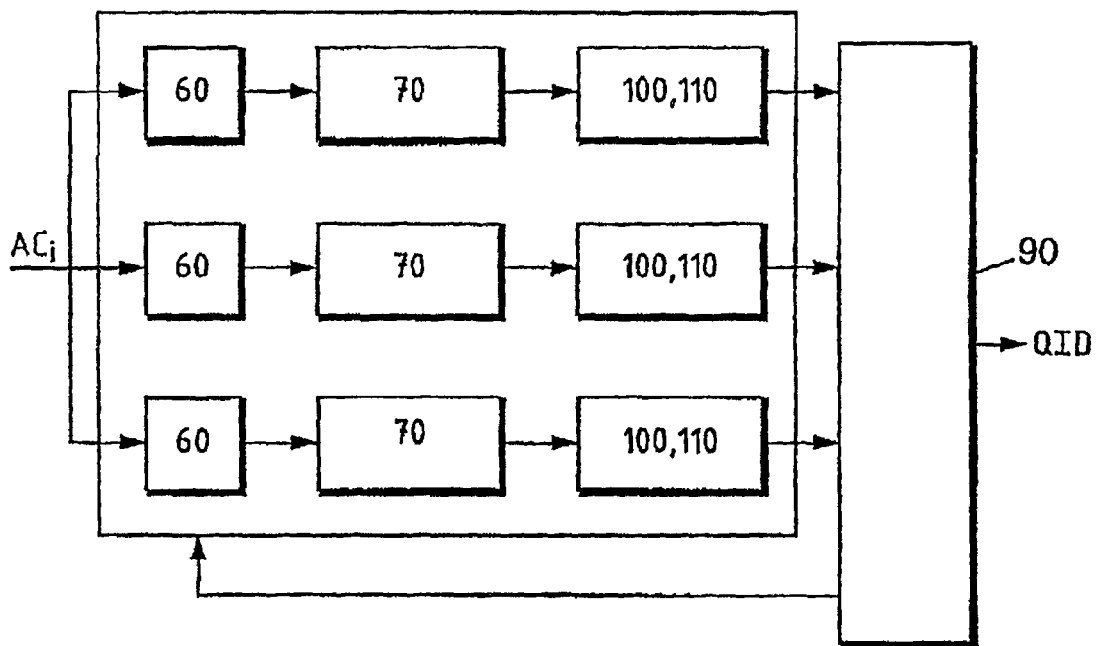
FIG. 7 shows schematically a variant of part of the device of FIG. 1.
Figure 8:
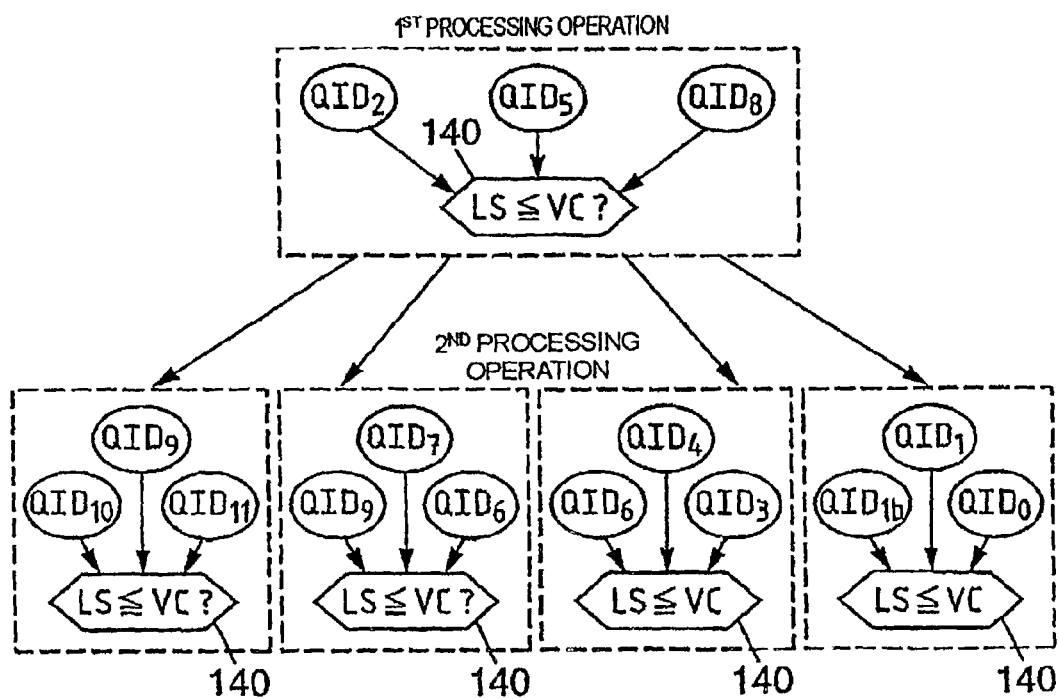
FIG. 8 shows schematically the steps for determining the identifier of the first quantization step set by means of the part of the device shown in FIG. 7.

According to a variant, illustrated in FIG. 7, of the device described above, the operations 60, 70 and 100 are carried out in parallel by three identical circuits 250. This assembly with three circuits 250 in parallel has the advantage of making it possible for the length LS of the quantized data to converge faster towards the target value VC. This is because, as illustrated in FIG. 8, during a first processing operation by the three circuits 250, three quantized data lengths LS are determined, starting with three different QIDs, and compared to the target value VC. According to the result of this comparison, three new QIDs are chosen to carry out a second processing operation by the three circuits 250. Three new data lengths LS, which are compared with the target value VC, result from this second processing operation. The parameter QID giving the length LS closest to VC by the least value is retained for the operations 160 and the following operations.

In fact another step is needed. This is because, if QID=1, then QID−1=0 and QID+1 is not equal to 2, but rather to a coefficient that could be denoted by QID1b. Nevertheless, this case is not very probable and the compression of a segment with QID=1 does not require further refinement.

It is obvious that the various operations described above may be carried out by one or more electronic circuit(s) and/or one or more processor(s) programmed in a manner suitable for implementing the method according to the invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of compressing a digital image signal having coefficients allocated to the pixels of an image, the method comprising:

forming spatial blocks of N×M coefficients allocated to the pixels of the image, where N and M are non-zero integers;

transforming each spatial block in a frequency domain in order to form a frequency block of N×M coefficients;

grouping a plurality of frequency blocks in macroblocks and of a plurality of macroblocks in segments, together with the following steps for each segment:

first quantization of the coefficients of each frequency block, with a first quantization step set, defined for each frequency block by an index group including an index which is identical for all the frequency blocks of a macroblock, and second quantization of the coefficients of at least some of the frequency blocks, with a second quantization step set substituted for the first quantization step set, the first and the second quantization step sets being chosen according to a target value of the amount of data needed to represent the quantized coefficients of the segment and according to gain factors respectively calculated for the frequency blocks of the segment, the gain factor relating to one block representing a reduction, on passing from one quantization step set to the other for the said block, of the amount of data necessary to represent the quantized coefficients, in which the gain factor calculated for a frequency block is the difference between the amounts of data needed to represent the quantized coefficients of the frequency block with the first set and with the second set, respectively, divided by the amount of data needed to represent the quantized coefficients of the said frequency block with the first set.

2. The method according to claim 1, in which the index which is identical for all the frequency blocks of one macroblock is also identical for all the macroblocks of one segment.

3. The method according to claim 1, in which the first quantization step set is chosen such that the amount of data representing the quantized coefficients of each segment, after the first quantization, is greater than the target value.

4. The method according to claim 3, in which the second quantization step set gives rise to a quantization which is coarser than the first quantization step set.

5. The method according to claim 4, in which the second quantization step set is chosen such that the amount of data representing the quantized coefficients of each segment, after the second quantization, is less than or equal to the target value.

6. The method according to claim 5, in which the second quantization is carried out as a priority for the frequency block of the segment for which the gain factor is highest, and repeated for at least one other frequency block of the segment, in order of decreasing gain as long as the amount of data needed to represent the coefficients of the segment is greater than the said target value.

7. The method according to claim 1, in which the amounts of data are calculated in the course of the first quantization and stored in order to calculate the gains.

8. The method according to claim 1, in which the first quantization comprises three processing operations in parallel, each processing operation comprising operations of quantization, of encoding and of calculating the amount of data needed to represent the quantized data of the segment.

9. A device for compressing a digital image signal, comprising:

means of inputting data represented by coefficients allocated to the pixels of an image, means of forming spatial blocks of N×M coefficients allocated to the pixels of the image, where N and M are non-zero integers, means of transforming each spatial block in a frequency domain in order to form a frequency block of N×M coefficients, and means of processing image segments, each one consisting of a given number of macroblocks, each consisting of a given number of frequency blocks, in which the means of processing a segment comprise:

first means of quantizing the coefficients of each frequency block of the segment, in order to select a first quantization step set, attached to each frequency block and defined for each frequency block by an index group including an index which is identical for all the frequency blocks of one macroblock, second quantization means for quantizing at least some of the frequency blocks, with a second quantization step set substituted for the first quantization step set, means of calculating, for each block, a gain factor representing a reduction, on passing from one quantization step set to the other, of the amount of data needed to represent the quantized coefficients, this gain factor being taken at the level of the second quantization means in order to select the frequency blocks for which the first quantization step set is substituted by the second quantization step set;

means of storing amounts of data needed to represent the quantized data corresponding to the segment, with the first set and with the second set, and calculated with respect to the first quantization; and means of calculating the gain factor, in which the gain factor for a frequency block is the difference between the amounts of data needed to represent the quantized coefficients of the said frequency block with the first set and with the second set, respectively, divided by the amount of data needed to represent the quantized coefficients of the said frequency block with the first set.

10. The device according to claim 9, comprising means of sorting the blocks having undergone the first quantization, in decreasing order of the gain factor.

11. The device according to claim 9, comprising means of substituting the second quantization step set for the first quantization step set, by processing the blocks, in order of decreasing gain factor, until the amount of data needed to represent the quantized data corresponding to the segment is less than or equal to a target value.

12. The device according to claim 9, in which the first quantization means comprise three quantization circuits in parallel.

13. An article of manufacture, comprising:

a computer-readable medium having machine-readable instructions stored thereon that are executable by a processor to compress a digital image signal having coefficients allocated to pixels of an image, by:

forming spatial blocks of N×M coefficients allocated to the pixels of the image, where N and M are non-zero integers;

transforming each spatial block in a frequency domain in order to form a frequency block of N×M coefficients; and grouping a plurality of frequency blocks in macroblocks and of a plurality of macroblocks in segments, together with the following for each segment:

first quantization of the coefficients of each frequency block, with a first quantization step set, defined for each frequency block by an index group including an index which is identical for all the frequency blocks of a macroblock, and second quantization of the coefficients of at least some of the frequency blocks, with a second quantization step set substituted for the first quantization step set, the first and the second quantization step sets being chosen according, on the one hand, to a target value of the amount of data needed to represent the quantized coefficients of the segment and, on the other hand, to gain factors respectively calculated for the frequency blocks of the segment, the gain factor relating to one block representing a reduction, on passing from one quantization step set to the other for the said block, of the amount of data necessary to represent the quantized coefficients, in which the gain factor calculated for a frequency block is the difference between the amounts of data needed to represent the quantized coefficients of the frequency block with the first set and with the second set, respectively, divided by the amount of data needed to represent the quantize coefficients of the said frequency block with the first set.

14. The article of manufacture according to claim 13, in which the first quantization step set is chosen such that the amount of data representing the quantized coefficients of each segment, after the first quantization, is greater than the target value.

15. A method of compressing a digital image signal having coefficients allocated to the pixels of an image, the method comprising:

forming spatial blocks of N×M coefficients allocated to the pixels of the image, where N and M are non-zero integers;

transforming each spatial block in a frequency domain in order to form a frequency block of N×M coefficients;

grouping a plurality of frequency blocks in macroblocks and of a plurality of macroblocks in segments by defining an index group for the frequency blocks of a macroblock;

quantizing the coefficients of each frequency block, with a first quantization step set, defined for each frequency block by an index group including an index which is identical for all the frequency blocks of a macroblock, and quantizing the coefficients of at least some of the frequency blocks, with a second quantization step set substituted for the first quantization step set, wherein the second quantization on step set is chosen according to gain factors respectively calculated for the frequency blocks of the segment, each gain factor being the difference between amounts of data needed to represent the quantized coefficients of the gain factor's respective frequency block with the first set and with the second set, respectively, divided by the amount of data needed to represent the quantized coefficients of the frequency block with the first set.

16. The method according to claim 15, in which the index which is identical for all the frequency blocks of one macroblock is also identical for all the macroblocks of one segment.

17. The method according to claim 15, in which the first quantization step set is chosen such that the amount of data representing the quantized coefficients of each segment, after the first quantization, is greater than the target value.

18. The method according to claim 15, in which the second quantization step set gives rise to a quantization which is coarser than the first quantization step set.

19. The method according to claim 15, in which the second quantization step set is chosen such that the amount of data representing the quantized coefficients of each segment, after the second quantization, is less than or equal to the target value.

* * * * *